United States Patent [19]

del Angel

[11] 4,305,962

[45] Dec. 15, 1981

[54] PROCEDURE FOR MAKING RESIN-ELASTOMER MASTERBATCHES AND THE PRODUCT OBTAINED

[75] Inventor: Abraham G. del Angel, Madero, Mexico

[73] Assignee: Hules Mexicanos, S.A., Mexico City, Mexico

[21] Appl. No.: 128,429

[22] Filed: Mar. 10, 1980

[51] Int. Cl.³ ............................................... A23G 3/30
[52] U.S. Cl. ........................................... 426/3; 426/6
[58] Field of Search ........................................ 426/3, 6

[56] References Cited

U.S. PATENT DOCUMENTS

| | | | |
|---|---|---|---|
| 1,134,073 | 3/1915 | Bradshaw | 426/6 |
| 1,975,447 | 10/1934 | Canning | 426/6 |
| 1,977,059 | 10/1934 | Hatherell | 426/6 |
| 2,070,047 | 2/1937 | Hatherell | 426/6 |
| 2,197,719 | 4/1940 | Conner | 426/6 |

*Primary Examiner*—Jeanette M. Hunter

*Attorney, Agent, or Firm*—Ladas & Parry

[57] ABSTRACT

Process for making elastomer-resin masterbatch using an ester gum type resin and an elastomer in latex form, process that involves the following steps: (a) fine grinding of the ester gum resin; (b) adding of the finely grinded resin to latex contained in a reactor, while maintaining a low temperature and continuous agitation of the ingredients within the reactor, in order to produce an emulsion; (c) coagulating the emulsion produced in the reactor by adding a saturated solution of sodium chloride until reaching a sodium chloride concentration in the batch between 1 to 10% and then adding sulphuric acid to complete coagulation of the batch; (d) separating the coagulated solid formed in crumbs from the liquid phase, which is discarded; (e) washing repeatedly the formed crumbs with water until obtaining the desired purity; (f) eliminating the excess water contained in the crumbs until a predetermined degree of moisture is obtained; (g) bagging of the final product for its handling and sale.

7 Claims, 1 Drawing Figure

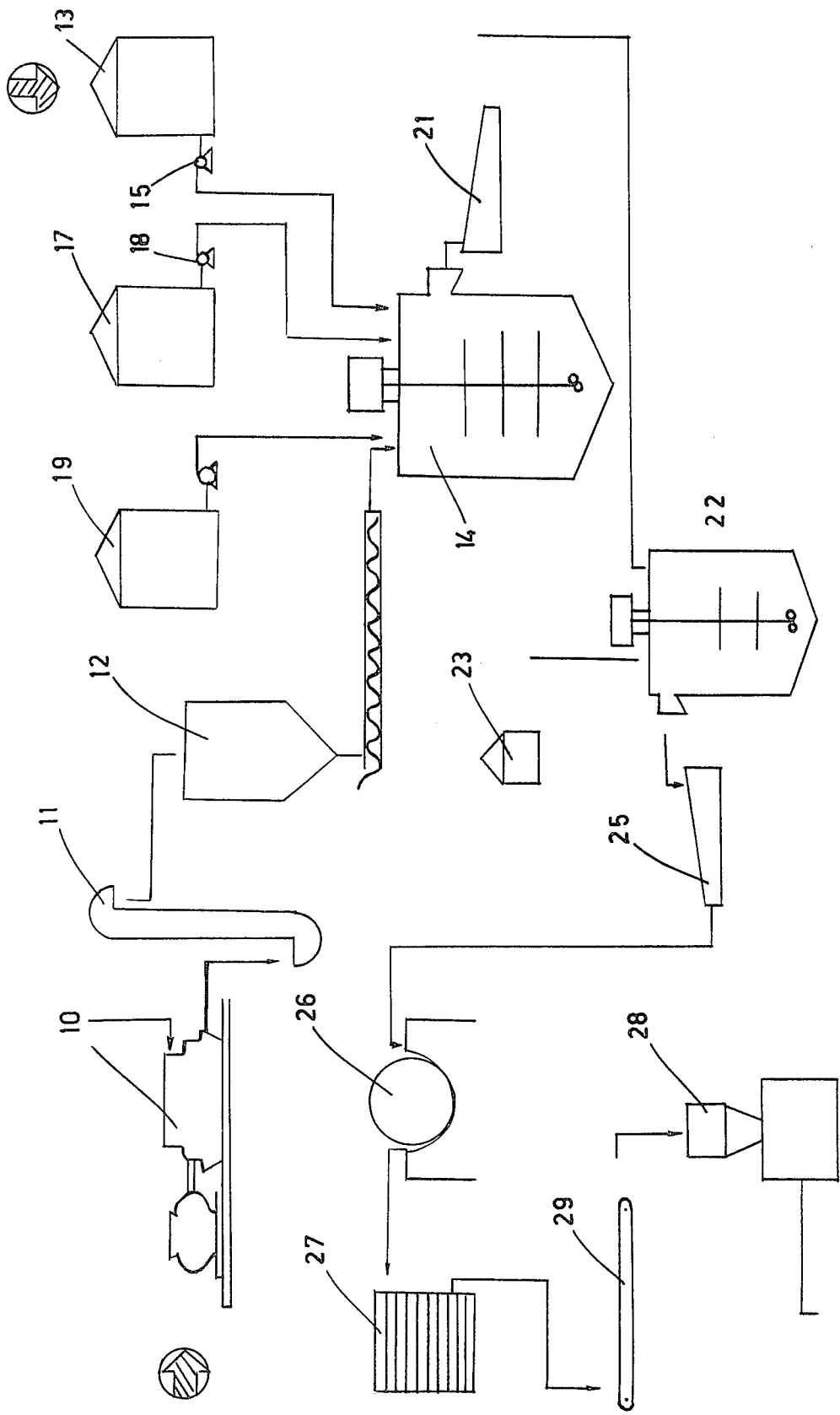

PROCEDURE FOR MAKING RESIN-ELASTOMER MASTERBATCHES AND THE PRODUCT OBTAINED

BRIEF DESCRIPTION OF THE INVENTION

This invention refers to a new product for the chewing gum industry, which shall be called "Resin-Elastomer Masterbatch", herein after referred as REMB, and more particularly to the novel process to make this product.

REMB can be used to produce base gum employed by the chewing gum industry for manufacturing chewing gum.

The process consists mainly in adding a finaly grinded resin ester gum to an elastomer in latex form. The finely grinded resin ester gum is obtained by grinding the resin is ester gum at a temperature below 36° C. The finely divided resin is then added to latex, at a pre-determined proportion, depending on the type of base gum required by the chewing gum industry to make chewing gum.

The resin addition is made while maintaining the mass in continuous agitation and at low temperature until achieving a complete emulsification. The resulting elastomer-resin emulsion is then coagulated by adding a saturated solution of sodium chloride until a concentration of 1% to 10% is obtained in the batch. Later, sulphuric acid is also added to complete coagulation.

As a result of coagulation of the emulsion it is obtained a solid product in the form of crumbs of prespecified consistency, together with a liquid usually called "serum", which is discarded. The obtained crumbs are then repeatedly washed with water in order to remove impurities and to obtain the desired purity for the resin-elastomer product. The wash water is then eliminated and the crumbs are dried and later bagged as final product for sale.

BACKGROUND OF THE INVENTION

In the manufacturing of chewing gum by the chewing gum industry, the main component is the base gum.

The base gum provides the properties and characteristics for the chewing gum such as: consistency, elasticity, plasticity, etc.

The base gum is a complex product where its main components are an elastomer, either natural or synthetic, and a resin.

PROCESS USED AT THE PRESENT TIME FOR MAKING BASE GUM

At the present time, the chewing gum industry makes its base gum from an elastomer in latex form and from an esterified resin of the ester gum type, usually in flake form. The first step is the coagulation of the latex to obtain a solid elastomer. Coagulation is a process not sufficiently known by the chewing gum industry, hence some coagulation problems affect this industry's manufacturing operations. Then, the second step of the process consists in the incorporation of the resin into the elastomer obtained by means of roll mills and addition of plasticizers. This process is efficient but is a time consuming and expensive process, which takes from 8 to 12 hours and consumes a great deal of electrical power at the mills when incorporating the resin into the elastomer, since the material is hard and sticky. Furthermore, it is necessary to maintain a close temperature control at the mill, to avoid degradation of the elastomer during its mastication.

DISADVANTAGES OF PRESENT PROCESS

1. Purchase of elastomer in latex form, involves higher transportation costs due to the high proportion of water (60% or more) contained in latex.
2. Coagulation is a process not sufficiently known in the chewing gum industry and causes problems to this industry when obtaining the solid elastomer.
3. Well trained and experienced operators are required to perform latex coagulation operations.
4. The present process is a time consuming one, that involves high power consumptions during the prolongued milling and mastication operations performed at the roll mills, which are equipped with high power electrical motors.

PROCESS FOR MAKING BASE GUM FROM REMB

This simple and relatively fast process, consists in loading a roll mill with the adequate type and quantity of REMB for making the base gum.

Then, plasticizers and/or lubricants are added at a proper sequence and after about two hours of milling, the desired base gum is obtained.

ADVANTAGES OF THE INVENTION

The following advantages can be obtained and can be enunciated when comparing the process of the invention with the process used at present time by the chewing gum industry:

1. By providing the chewing gum industry an intermediate master batch product from which chewing gum can be readily made.
2. By providing the intermediate product mentioned in (1) that greatly simplifies the manufacture of chewing gum.
3. By providing the intermediate masterbatch product mentioned in (1) where the masterbatch consists in resin ester gum easily incorporated into an elastomer by the novel process of this invention.
4. By providing the intermediate masterbatch product mentioned in (1) produced by the novel process of this invention, where the resin ester gum is easily incorporated into an elastomer by means of an emulsifying process operation followed by a coagulation process operation.
5. By providing the intermediate masterbatch product mentioned in (1) that greatly simplifies the process of chewing gum manufacturing at the chewing gum industry, by eliminating the elastomer coagulating operation and the subsequent elastomer resin ester gum incorporation operation, both operations actually carried out at the chewing gum industry.
6. By providing the intermediate masterbatch product mentioned in (1) that greatly simplifies the process of chewing gum manufacturing by eliminating the problematic coagulation operation carried-out at the chewing gum industry.
7. By providing the intermediate masterbatch product mentioned in (1) that greatly simplifies the process of chewing gum manufacturing by eliminating the long time and energy consumed in the incorporation of elastomer with resin ester gum.
8. By providing the intermediate masterbatch product mentioned in (1) which greatly reduces the usual 8 to 10 hours process time for base gum manufacturing at the chewing gum industry to about 2 hours total process time at this industry.

SUMMARY OF THE INVENTION

The present invention consists in a fast, easy and economical process to make REMB, which is a product that can be used by the chewing gum industry for the manufacture of chewing gum.

The process in turn consists, in incorporating resin ester gum into an elastomer in latex form contained within a reactor where the latex is maintained at low temperature and under continuous agitation; coagulating the resulting emulsion by means of a saturated solution of sodium chloride; completing the coagulation by adding sulphuric acid; separating the resulting crumbs and "serum" of coagulation; discarding the serum; washing the crumbs; drying the crumbs and bagging the crumbs for their sale as final product called REMB.

One objective of the invention is to provide the chewing gum industry with an intermediate product which can be used to easily manufacture chewing gum.

Another objective of the invention is to simplify the process used at the chewing gum industry for the manufacture of chewing gum, by eliminating the coagulation operation and the incorporation operation of elastomer and resin ester gum, such that operations are carried out at the present time at the chewing gum industry.

Another objective of the invention is to reduce the time for the manufacture of the base gum used to make chewing gum.

Finally another objetive of the invention is to reduce the cost of the manufacture of chewing gum, by reducing time and power consumed at the present time by the chewing gum industry.

DETAILED DESCRIPTION OF THE INVENTION

Following are described the important aspects of the invention as well as the manufacturing conditions.

The enclosed Drawing 1 shows the process flow diagram.

The first step of the process consists in feeding resin ester gum to Roll Mill 10, which is provided with a nitrogen cooling system to maintain mill rolls temperature below 36° C. to avoid reaching the resin's softening point. The resin is grinded until particle's sizes attained are between 10 and 100 Mesh.

The grinded resin is then taken to Weighing Hopper Bin 12 by means of Bucket Elevator 11.

While the resin ester gum grinding is carried-out, latex from Tank 13 is transferred by means of Pump 15 to Reactor 14 provided with an agitator. Once Reactor 14 has been loaded with the required amount of latex, a vigorous latex agitation is started with an agitator's speed of 300 to 750 RPM and immediately after, a predetermined amount of already grinded resin ester gum is slowly fed into the reactor by means of Screw Conveyor 16. The required amount of latex and the predetermined amount of resin ester gum are fixed according to the desired proportion or ratio of resin to latex to be used.

The vigorous agitation is used in order to rapidly attain a complete emulsification of the reactor contents. Once all the predetermined amount of resin ester gum has been added and a complete emulsion obtained, agitator's speed is reduced to between 20 and 90 RPM to continue with a slow agitation of the emulsion. During the emulsification process, the reactor's contents must be maintained at a temperature between 3° C. and 35° C. and at atmospheric pressure. Afterwards, the reactor's batch is coagulated by means of a saturated solution of sodium chloride, which is added until a sodium chloride concentration between 1 and 10% is reached in the batch.

The saturated solution of sodium chloride is fed from Tank 19 to Reactor 14 by means of Pump 20. Then, sufficient sulphuric acid is added to the reactor's batch to complete batch's coagulation. The sulphuric acid is fed from tank 17 to reactor 14 by means of Pump 18.

As result of batch's coagulation, crumbs of integrated elastomer-resin ester gum are formed and are maintained dispersed in a liquid phase called "serum".

The reactor's contents or reactor batch is then transferred to a Screen Filter 21 to separate the crumbs from the serum which is discarded Crumbs from Filtering Screen 21 are sent to Washing Tank 22 provided with agitation in order to wash-out impurities and excess salt. The washing operation is made with hot water between 40° C. and 80° C., which is sent from Tank 23 by means of Pump 24. The washed crumbs are then passed to Screen filter 25 to eliminate excess water. The washed clean crumbs are sent to Rotary Filter 26 and to Pan Dryer 27, from which crumbs with 3% to 10% moisture are obtained. From Dryer 27, the crumbs are transferred by Belt Conveyor 29 to Bagging Machine 28, where they are weighed and packed in Bags (30).

The crumbs so produced by the aforedescribed process constitute the final product which is called REMB.

The following three examples of laboratory experiment were carried-out to develop the optimum process for producing REMB:

EXAMPLE 1

Laboratory experiment for obtaining a sample of REMB in Ratio of 1:2 (1 elastomer and 2 Parts resin ester gum).

14 Kg. of resin ester gum were finely grinded to a 60 Mesh particle size, while maintaining a mill temperature of 22° C.±4° C. to prevent resin softening.

The grinded resin was then placed into a Dosifying Bin which served as a temporary storage. Grinding time was about 30 minutes. Then 7 Kgs. of latex were introduced into a laboratory reactor provided with an agitator. Loading of the reactor and agitation of latex inside the reactor to keep it homogenized took about 20 minutes. Then the 14 Kg. of finely grinded resin were slowly added to the latex while maintaining the latex under a vigorous agitation in order to affect emulsification of the reactor contents. Complete emulsification of the latex with the resin ester gum was achieved in about 30 minutes. Operating conditions at the reactor were: temperature 20° C., pressure: atmospheric; agitation: variable, with agitator speed of 400 RPM during emulsification and of 50 RPM after the emulsion batch was obtained. Then, while maintaining agitation, the emulsion batch was coagulated by adding a saturated solution of sodium chloride until reaching a 4% sodium chloride concentration in the batch. Then, sulphuric acid was added to complete coagulation of the emulsion batch. Addition of the coagulants and complete coagulation of the batch was achieved in about 15 minutes. The coagulated batch was passed to a vibrating screen to separate to crumbs formed from the liquid serum, which was discarded. The time used for this separation was of about 40 minutes.

The separated crumbs were then passed to a washing tank with hot water at 50° C. for crumbs washing.

The washed crumbs were passed again across the vibrating screen in order to eliminate excess water. Afterwards, the crumbs were passed to a rotary filter to reduce furthermore their water content and then the crumbs were placed in a pan dryer to dry the crumbs to a find moisture content of 5%. Drying time was of about 30 minutes. The dried crumbs were then taken out from the dryer and cooled by exposing them to ambient conditions. These clean and dried crumbs constituted the sample of REMB of a 1:2 ratio of elastomer to resin ester gum.

EXAMPLE 2

Laboratory experiment for obtaining a sample of REMB in Ratio of 1:3 (1 Part elastomer and 3 parts of resin ester gum).

21 Kgs. of resin ester gum were finely grinded until obtaining particles of 80 Mesh size, while maintaining a temperature of 16° C.±4° C. at the pulverizing mill.

Grinding time was approximately 50 minutes. The grinded resin was then passed to a Dosifying Bin.

Then 7 Kgs. of latex were introduced into a laboratory reactor provided with an agitator. Loading of the reactor and agitation of latex inside the reactor to keep it homogenized took about 20 minutes. Then, the 21 Kgs. of finely grinded resin were slowly added to the latex contained within the reactor while maintaining the latex under a vigorous agitation with an agitator's speed of about 600 RPM and at a temperature of 15° C. and atmospheric pressure. As the grinded resin was added to the latex under such conditions, an emulsion was being produced. Once the emulsion batch was completely formed, it was maintained under a 70 RPM agitation. Afterwards, the emulsion so obtained was coagulated by adding a saturated solution of sodium chloride until a sodium chloride concentration of 9% was attained in the batch. Then coagulation was completed by adding sulphuric acid. The emulsification and coagulation times were respectively of about 35 and 20 minutes.

The coagulated batch was then passed to a vibrating screen in order to separate the crumbs and serum resulting from coagulation. The serum was discarded. The time used for this operation was of about 30 minutes. Then, the crumbs were passed to an open wash tank for their washing with hot water at 60° C. After washing, the crumbs were again passed to the vibrating screen to eliminate excess water. Then, the crumbs were passed to a rotary filter to reduce even more their water content. Finally, the crumbs were placed in a pan dryer for about 40 minutes.

The dried crumbs constituted the sample of REMB with a moisture content of 8% and of an elastomer to resin ratio of 1:3.

EXAMPLE 3

Laboratory experiment for obtaining a sample of REMB in Ratio of 1:1.5 (1 Part elastomer and 1.5 Parts of resin ester gum)

15 Kgs. of resin ester gum were finely grinded until particles of 40 Mesh size were obtained, while controlling the pulverizing mill temperature about 10° C.±4° C. and during 40 minutes of grinding time. After grinding, the resin grinded was temporarily placed in a dosifying bin. Then, 10 Kgs. of latex were placed inside a laboratory reactor provided with agitator. Loading of the reactor and agitation of latex inside the reactor to keep it homogenized took about 25 minutes. Afterwards, the 15 Kgs. of finely grinded resin were slowly added, while maintaining a vigorous agitation with the agitator at approximately 350 RPM in order to rapidly obtain an emulsion. Once the whole amount of resin was added and a complete batch emulsion obtained, the emulsion was then maintained with a slower agitation of about 40 RPM. The time required for obtaining a complete emulsification of the batch was of about 25 minutes, while maintaining a temperature of 20° C. and atmospheric pressure. Afterwards, the emulsion batch was coagulated within the reactor by means of a saturated solution of sodium chloride until reaching a 3% concentration of Sodium Chloride in the batch and inmediately after sulphuric acid was added to complete the batch coagulation.

The time required for coagulation was of about 50 minutes. The coagulated batch was then passed to a vibrating screen in order to separate the crumbs and serum formed as result of coagulation. The serum was discarded and then the crumbs were placed in an open washing tank where the crumbs were washed with hot water at a 70° C. temperature, after washing, the crumbs were passed across the vibrating screen in order to eliminate excess water. The washed crumbs were then passed to a rotary filter for further elimination of the contained water. Finally, the crumbs were placed in a pan dryer to dry the crumbs to a 6% final moisture content. The dried crumbs obtained by the above process, constituted the sample of REMB of a 1:1.5 elastomer to resin ester gum ratio.

What is claimed is:

1. Process for making elastomer-resin masterbatch using an ester gum type resin and an elastomer in latex form, the process comprising the following steps:
   (a) fine grinding of the ester gum resin;
   (b) adding of the finely ground resin to latex contained in a reactor, while maintaining a temperature from about 3° to 35° C. and continuous agitation of the ingredients within the reactor, in order to produce an emulsion;
   (c) coagulating the emulsion produced in the reactor by adding a saturated solution of sodium chloride until reaching a sodium chloride concentration in the batch between 1 to 10% and then adding dilute sulphuric acid in an amount effective to neutralize the batch to complete coagulation of the batch;
   (d) separating the coagulated solid formed in crumbs from the liquid phase, which is discarded;
   (e) repeatedly washing the formed crumbs with water until obtaining the desired purity;
   (f) eliminating the excess water contained in the crumbs until a moisture content from about 3% to about 10% is obtained;
   (g) bagging of the final product for its handling and sale.

2. The process of claim 1, wherein the grinding of the resin ester gum is carried out at a temperature below 36° C.

3. The process of claim 1, wherein the finely ground ester gum is added to latex within a reactor while maintaining continuous agitation until attaining complete emulsification.

4. The process of claim 1, wherein the latex is of a natural elastomer.

5. The process of claim 1, wherein the latex is of a synthetic elastomer.

6. The process of claim 1, wherein the resin being used is a mixture of esterified resinic acids is of the ester gum type.

7. The product obtained by the process of claim 1.

* * * * *